Feb. 14, 1961 E. M. ROSCHKE 2,972,009

SUBSCRIPTION TELEVISION SYSTEM

Filed Aug. 1, 1957 2 Sheets-Sheet 1

Inventor
Erwin M. Roschke
By John J. Pederson
Attorney

Feb. 14, 1961 E. M. ROSCHKE 2,972,009

SUBSCRIPTION TELEVISION SYSTEM

Filed Aug. 1, 1957 2 Sheets-Sheet 2

Inventor
Erwin M. Roschke
By John J. Pederson
Attorney

United States Patent Office 2,972,009

Patented Feb. 14, 1961

2,972,009

SUBSCRIPTION TELEVISION SYSTEM

Erwin M. Roschke, Des Plaines, Ill., assignor to Zenith Radio Corporation, a corporation of Delaware Filed Aug. 1, 1957, Ser. No. 675,764

14 Claims. (Cl. 178—5.1)

Figure 1:
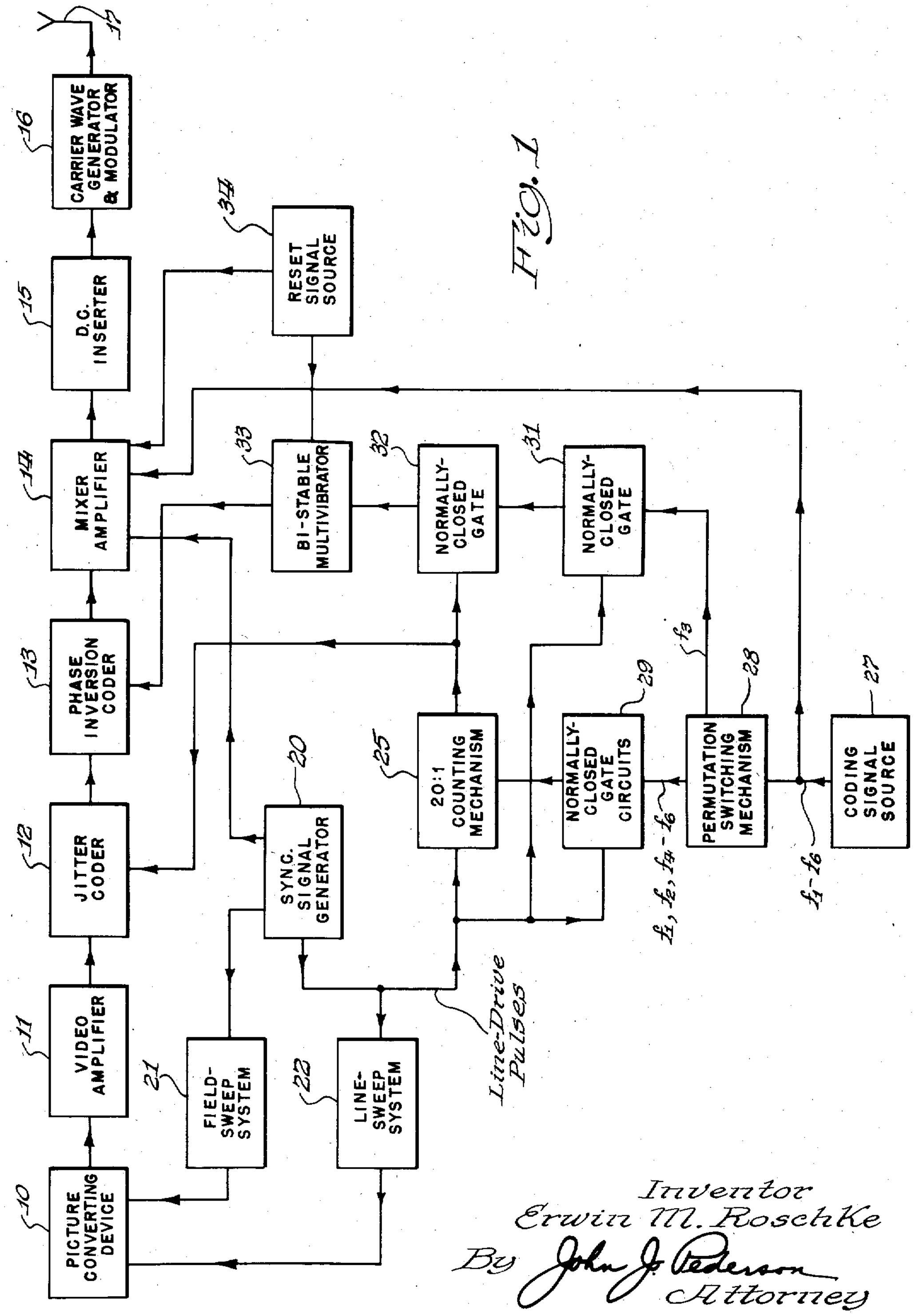

This invention relates to a subscription television system in which a television signal is transmitted in coded form to be utilized only in subscriber receivers containing adjustable decoding equipment that has been previously adjusted in a prescribed manner. Since the invention may be practiced in either a transmitter or receiver, the term "encoding" is used herein in its generic sense to encompass either coding at the transmitter or decoding at the receiver.

Subscription television systems have been developed which effect coding or scrambling of the television signal in accordance with various techniques. For example, in a system described in Patent 2,510,046, Ellett et al., issued May 30, 1950, and assigned to the present assignee, coding is accomplished by phase inverting the video components from time to time at random between two different operating modes in accordance with a secret code schedule so that "black" portions of an image are displayed in white on the picture screen at an unauthorized receiver, and vice versa. Patent 2,547,598, Roschke, issued April 3, 1951, and assigned to the present assignee, discloses a scheme wherein portions of the television signal, for example the video signals occurring during certain line-trace intervals, are occasionally delayed with respect to other portions, such as the line-synchronizing components immediately preceding those line-trace intervals, to produce a picture display at an unauthorized receiver that horizontally "jitters" back and forth at an eye disturbing rate. As another example of a different type of encoding, Patent 2,677,719, Reeves, issued May 4, 1954, and assigned to the present assignee, describes a scrambling technique wherein the direction of field or vertical scanning is reversed during certain spaced time intervals to provide two different modes of operation so that the picture display alternates between right-side up and upside-down presentations.

There have also been developed numerous systems containing a code selector that must be adjusted by the subscriber in a particular manner unique for each program in order that the decoding operation may be carried out in precise synchronism with the coding operation at the transmitter, so that the code schedule employed at the receiver agrees with that utilized at the transmitter. The subscriber may be assessed for the providing of the adjustment information required for each program. The particular scrambling technique employed may be immaterial. Systems including such code selectors may be found, for example, in copending applications Serial No. 268,966, filed January 30, 1952, and issued June 25, 1957, as Patent 2,797,260 in the name of Erwin M. Roschke; Serial No. 281,418, filed April 9, 1952, and issued July 15, 1958, as Patent 2,843,656, in the name of George V. Morris et al.; Serial No. 326,107, filed December 15, 1952, and issued Feb. 11, 1958, as Patent 2,823,252, in the name of Jack E. Bridges; and Serial No. 479,170, filed December 31, 1954, in the name of Erwin M. Roschke; all of which are assigned to the present assignee.

The present invention achieves an extremely complex mode changing or scrambling pattern wherein two different coding techniques are employed to simultaneously effect two different types of encoding of the television signal in accordance with two distinctly different code schedules, and yet only one adjustable code selector is necessary whose instantaneous adjustment determines at least in part the two different code schedules.

It is, accordingly, an object of the present invention to provide an improved subscription television system in which a television signal is coded with a high degree of complexity.

It is another object of the present invention to provide a new and improved subscription television system that achieves considerably enhanced scrambling or "muss up" of the picture display on the screen of an unauthorized receiver.

It is another object of the invention to provide a subscription television system wherein two different characteristics of a television signal are coded by two different coding techniques and in accordance with two different code schedules.

It is still another object of the invention to provide an improved subscription television system in which coding is achieved in such a manner that unauthorized decoding is virtually eliminated.

A subscription television system, constructed in accordance with the invention, comprises means for developing a television signal. Encoding apparatus is coupled to the television-signal-developing means and includes first and second encoding devices responsive to applied signals for varying two different characteristics of the television signal to effect two different types of encoding. Means including an adjustable code selector are provided for developing two different actuating signals representing first and second distinctly different code schedules as determined at least in part by the instantaneous adjustment of the code selector. There are means for utilizing the actuating signals for effecting operation of the first and second encoding devices in accordance with the first and second code schedules, respectively, to develop an encoded television signal. Finally, the subscription television system has means for utilizing the encoded television signal.

Figure 2:
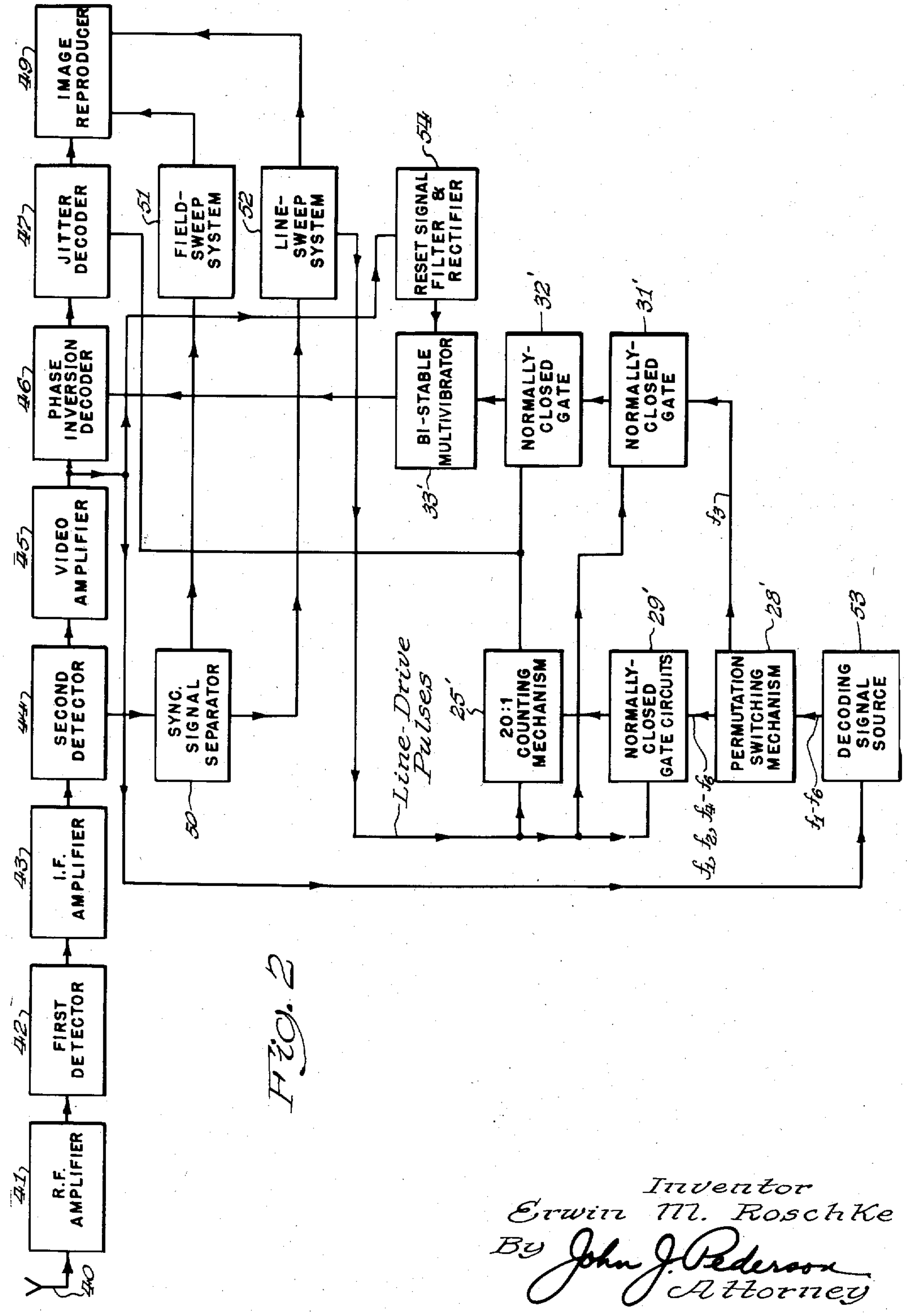

The features of this invention which are believed to be new are set forth with particularity in the appended claims. The invention, together with further objects and advantages thereof, may best be understood, however, by reference to the following description in conjunction with the accompanying drawings, in which:

Figure 1 is a block diagram representation of a subscription television transmitter constructed in accordance with the invention; and Figure 2 illustrates a subscription television receiver in schematic form constructed in accordance with the invention for operation in conjunction with the transmitter of Figure 1.

Turning now to the structural details of the transmitter of Figure 1, a picture converting or pick-up device 10, which may be of any well known construction for deriving a video signal representing the image to be televised, is coupled through a video amplifier 11 to a jitter coder 12. This coder may be similar to that disclosed and claimed in Patent 2,758,153, issued August 7, 1956, to Robert Adler, and assigned to the present assignee. It may comprise a beam-deflection tube having a pair of collector anodes connected respectively to a pair of output circuits which may be selectively interposed into the video channel as the electron beam is deflected from one to the other of the two anodes. One of these output circuits includes a delay line so that the timing of the video components relative to the synchronizing components of the radiated television signal varies as the beam of the deflection tube is switched between its anodes. This switching effect between the two different operating conditions is accomplished by means of a beam deflection-control or actuating signal applied to jitter coder 12, as will be explained.

Varying the relative timing of the video and synchronizing components from time to time effectively codes one characteristic of the picture information since conventional television receivers, not containing counterpart video decoding apparatus, require a constant time relation between the video and synchronizing components to effect faithful image reproduction. In other words, if portions of the video information received at an unauthorized receiver are delayed with respect to the periodically recurring line-synchronizing components during spaced intervals and this delay is not compensated, the resulting picture display on the picture tube shifts or jitters back and forth.

Jitter coder 12 is cascade connected with a phase inversion coder 13 which responds to amplitude changes of an applied control signal for inverting or reversing the phase of the applied video signal. A coder of this type is described in detail in the aforementioned Ellett et al. Patent 2,510,046. In that patent, a phase splitter supplies the video signal to an electronic selector switch in push-pull relationship, namely, with two different phases 180° apart. The switch is actuated by an applied actuating signal to select certain portions of each of the two signals from the phase splitter. Reversing the phase of a video signal, of course, results in the presentation of white displays for what is ordinarily "black" picture information and, conversely, black picture displays for what is normally "white" image information. In other words, successive actuations of the phase inversion coder results in alternate "positive" and "negative" picture transmission.

The output of phase inversion coder 13 is coupled to one input of a mixer amplifier 14 which is coupled through a direct-current inserter 15 to a carrier wave generator and modulator 16 which, in turn, is connected to an antenna 17. The transmitter also includes a synchronizing-signal generator 20 which supplies the usual field- and line-synchronizing and associated pedestal components to mixer amplifier 14 as shown by the connection between those two units. Generator 20 additionally supplies field- and line-drive pulses to a field-sweep system 21 and a line-sweep system 22, respectively, which are connected to associated deflection elements (not shown) in picture converting device 10.

Generator 20 also applies line-drive pulses to a 20:1 control or counting mechanism 25 which may comprise a conventional 5:1 step down blocking oscillator and two conventional bi-stable multivibrators, all three circuits connected in cascade, in order to exhibit a total 20:1 division rate with respect to the applied line-drive pulses. Counter 25 thus steps from one to another of a total of twenty steps or conditions in a predetermined sequence in completing each operating cycle. Such an arrangement develops a square wave control or actuating signal having amplitude variations occurring after every ten line-trace intervals. A similar cyclic actuated counting mechanism is shown in the copending Roschke application, Serial No. 479,170. The output terminals of control mechanism 25 are connected to the deflection elements of jitter coder 12 to supply a deflection control or actuating signal thereto in order to effect actuation of coder 12 between its two operating conditions and code one characteristic of the television signal in accordance with a code schedule represented by the amplitude changes or excursions of the actuating signal.

A coding signal source 27 is provided which may comprise a code signal generator containing a series of six individual signal generators for developing during a portion of each field-retrace interval a combination of code signal components or bursts each of which has a predetermined identifying characteristic such as frequency and collectively determining a code pattern in accordance with their appearance and order within the combination. A suitable code signal generator of this type for producing bursts of six different frequencies, designated $f_1$–$f_6$, is fully disclosed and claimed in copending application Serial No. 463,702, filed October 21, 1954, in the name of Carl G. Eilers et al., and assigned to the present assignee. The output terminals of code generator 27 are connected to mixer 14 in order to add the code bursts or components to the composite video signal for concurrent radiation therewith.

Coding signal source 27 controls counting mechanism 25 in a manner fully described in the Roschke copending application, Serial No. 479,170. More particularly, source 27 is connected to an adjustable is connected to an adjustable code selector or permutation switching mechanism 28 which, in turn, is coupled to a series of normally-closed gate circuits, designated by a single block 29 for simplicity, each of which is also connected to synchronizing-signal generator 20 to receive line-drive pulses therefrom. The output circuits of gates 29 connect to the input circuits of the two multivibrators of counting mechanism 25. Of course, the coupling circuitry between units 28 and 29 and between units 29 and 25 actually comprise several different conductors, as fully described in the copending Roschke application, but for schematic simplicity single connectors only have been illustrated.

For the air borne coding information to be itself coded, it must distinguish from the code information applied to counter 25. For that purpose, code selector 28 effects a permuting operation or function and may include a multi-element switching arrangement from which the code signal components exhibiting five of the six various signal frequencies are selectively taken for delivery to gate circuits 29 to gate in selected line-drive pulses to control mechanism 25. For illustrative purposes it is assumed that the instantaneous adjustment of code selector 28 is such that only bursts of frequencies $f_1$, $f_2$ and $f_4$–$f_6$ are translated to gate circuits 29. The purpose of gates 29 is to insure that counting mechanism 25 is actuated by precisely timed and sharply defined line-drive pulses as gated in by the code signal bursts.

Suitable adjutable code selectors that may be used for unit 28 that provide adequate degrees of security against unauthorized deciphering are disclosed and claimed in, for example, copending applications Serial No. 407,192, filed February 1, 1954, and issued December 30, 1958, as Patent 2,866,961, in the name of George V. Morris; Serial No. 419,301, filed March 29, 1954, and issued August 19, 1958, as Patent 2,847,768, in the name of Jack E. Bridges; Serial No. 490,078, filed February 23, 1955, in the name of George V. Morris et al.; and Serial No. 555,541, filed December 27, 1955, and issued September 8, 1959, as Patent 2,903,686, in the name of Jack E. Bridges, all of which are assigned to the present assignee.

The circuitry represented in block diagram form by units 27—29 and 25 is all described in detail in the copending Roschke application, Serial No. 479,170. In accordance with the teachings of that application, counting mechanism 25 is actuated in cyclic fashion from the periodically recurring line-drive pulses during the field-trace intervals but that cyclic actuation is interrupted during a portion of each field-retrace interval by the code signal components from source 27 to increase the coding complexity. The control or actuating signal developed in the output of counting mechanism 25 thus constitutes a phase modulated square wave having amplitude changes at a periodic rate (namely, every ten line-trace intervals) during the field-trace intervals due to the effect of the periodically recurring line-drive pulses, but during the field-retrace intervals the normally cyclic operation is disrupted in accordance with the secret code pattern represented by the code signal components developed in source 27. Thus, the square wave actuating signal is rephased during each field-retrace interval.

One of the output circuits of permutation switching mechanism 28 is connected to a normally-closed gate circuit 31 to which is supplied line-drive pulses from generator 20, and the output of this gate is connected in turn to the input of another normally-closed gate circuit 32 having another pair of input terminals connected to the output of counting mechanism 25. With the assumed setting of code selector 28, bursts of frequency $f_3$ would be supplied to gate 31. The output circuit of gate 32 is connected to the input of a bi-stable multivibrator 33 connected in turn to the control circuit of phase inversion coder 13.

As will be apparent in a discussion of the receiver, there is a counterpart multivibrator at the receiver corresponding to multivibrator 33. It is possible that noise or other extraneous signals may cause the receiver multivibrator to fall out of step occasionally with the corresponding multivibrator 33 at the transmitter. To remedy this condition it is desirable to provide a reset circuit which is operated from time to time during a subscription telecast to translate a signal to the transmitter multivibrator 33 and to control the application of a corresponding signal to the counterpart multivibrators at the various authorized receivers for resetting or locking in of all the equipment. Appropriate reset arrangements are disclosed in detail in other copending applications, such as Serial No. 344,996, filed March 27, 1953, in the name of Carl G. Eilers et al., and assigned to the present assignee, now abandoned, and therefore is merely illustrated in the present case by a reset signal source 34 having one pair of output terminals connected to an additional input circuit of multivibrator 33 and another pair of output terminals connected to mixer 14. Source 34 supplies pulses to reset multivibrator 33 at the transmitter to a predetermined reference operating condition, and also supplies reset bursts of a preselected frequency, different from frequencies $f_1$–$f_6$, to mixer 14 wherein they are combined with the composite television signal and code signal components for transmission to the subscriber receivers to produce corresponding reset pulses for resetting the decoding equipment. Resetting may occur, for example, as in the aforementioned Eilers et al. application, Serial No. 344,996, once every sixty field-trace intervals, at which time a pulse is developed at the transmitter and duplicated at the receiver for delivery to the counting circuits employed in that application. Such reset circuitry may very conveniently be employed as signal source 34.

Considering now the operation of the transmitter of Figure 1, picture converter 10 produces a video signal representing the image information to be televised and this signal, after amplification in video amplifier 11, is translated through cascade connected coders 12 and 13 to mixer 14 wherein it is combined with the customary periodically recurring field- and line-synchronizing and blanking pulses from synchronizing-signal generator 20 to develop a composite video signal which is supplied to direct-current inserter 15 wherein it is adjusted with respect to proper background level. The adjusted video signal is then amplitude modulated on a picture carrier in unit 16 and the modulated carrier is then applied to antenna 17 for transmission to subscriber receivers. Sweep systems 21 and 22 are synchronized by field- and line-drive pulses from generator 20 in conventional manner. The audio portion of the television system has not been shown in order not to encumber the drawings. Of course, if desired the sound information may be coded.

Jitter type coding of the telecast is achieved by coder 12 under the influence of an actuating signal developed by counting mechanism 25 for switching the beam of the beam-deflection tube in that coder back and forth between its two collector anodes in accordance with the code schedule represented by the amplitude variations of the applied actuating signal. This actuation of encoding device 12 varies the operating mode by modifying the time relation between the video and synchronizing components of the radiated signal and provides in itself effective picture scrambling or coding. The actuating signal for encoding device 12 is developed from line-drive pulses applied by generator 20 to control mechanism 25 wherein they are divided at a 20:1 ratio to produce a square wave signal having amplitude variations occurring after every ten successive line-trace intervals. The square wave as applied to jitter coder 12 therefore effects mode changes every ten line traces and since there are 262½ line-trace intervals per field (in accordance with United States standards), such a mode changing rate is obviously considerably faster than the field-scanning frequency. This results in break up of each picture field into a multiplicity of horizontal strips that jitter back and forth with respect to each other on the screen at an unauthorized subscriber's receiver.

In order to interrupt this periodic mode changing pattern and increase the complexity of the coding schedule, a combination of code signal components of up to six different frequencies $f_1$–$f_6$ is developed in source 27 during a portion of each field-retrace interval. After being subjected to a permuting operation by means of switching mechanism 28, these code signal components are utilized to gate in selected line-drive pulses to the various input circuits of counting mechanism 25, specifically the input circuits of the two multivibrators thereof, in order to actuate the mechanism to different ones of its operating steps or conditions in the manner disclosed in complete detail in copending application Serial No. 479,170, Roschke.

Switching mechanism 28 is preferably adjusted differently for each program interval and each subscriber is assessed for the switch setting information provided to him. The particular instantaneous adjustment of code selector 28 determines on the basis of frequency which code signal components are supplied to normally-closed gate circuit 31. In other words, mechanism 28 may be so adjusted that components exhibiting five of the six various frequencies employed for the code bursts developed in source 27 are channeled to gate circuits 29 whereas the components having the sixth frequency are routed to gate 31. As mentioned before, for illustrative purposes it is assumed that bursts of frequency $f_3$ are translated to gate 31. Because the components selected for gate 31 are dependent on the switch setting of mechanism 28 that sixth frequency may, of course, exhibit any one of the six employed. The frequency channeled to gate 31 may be fixed (namely, may be the same for all programs) by merely by-passing code selector 28. In this way, a connection would be made directly from an individual generator in source 27 to gate 31.

The $f_3$ code components supplied to gate 31 gate in selected line-drive pulses from generator 20 to normally-closed gate circuit 32. The translating condition of gate 32 is controlled by the output of counting mechanism 25 such that during the half-cycle intervals when the phase modulated square wave actuating signal developed by mechanism 25 exhibits a positive amplitude level (assuming the axis of the square wave is established at zero reference potential), gate 32 is established in its translating or open condition, whereas during the intervening negative half cycles gate 32 is established in its non-translating or closed condition. Thus, even if the $f_3$ code bursts are channeled to gate 31 to gate in line-drive pulses to gate 32, such gated-in line-drive pulses are only translated to multivibrator 33 when gate 32 assumes its translating condition.

Thus, multivibrator 33 is triggered back and forth in response to successive applied pulses from gate 32 and since the $f_3$ code signal components effect the translation of pulses through gate 32 only during portions of the field-retrace intervals (none being translated during a field-trace interval), multivibrator 33 once actuated will remain in the same condition throughout a field-trace interval. Consequently, an actuating signal is applied to phase inversion coder 13 from multivibrator 33 that may be characterized as having a frequency that is slower than the field-scanning frequency. The multivibrator may, of course, be operated more than once during any given field-retrace interval or may not be triggered at all, but in any event it will remain in the same condition throughout the immediately succeeding field-trace interval.

Each time multivibrator 33 is triggered from its instantaneous condition to its opposite condition, coder 13 effectively changes operating mode. When multivibrator 33 is established in a predetermined one of its conditions a phase inversion is introduced between the video signal applied to coder 13 and that which is supplied to mixer 14, whereas when unit 33 is in the other condition the video signal is translated without inversion. Since the radiated line-synchronizing components always exhibit the same phase or polarity, it may be said that during certain spaced intervals the phase of the video components is inverted with respect to that of the synchronizing components whereas during the intervening intervals the video and sync components exhibit the conventional phase relationship. Because of the random aspect of the code signal bursts, the resulting actuating signal applied to coder 13 from multivibrator 33 has a code schedule (as represented by its amplitude variations) that is random in nature. It is distinctly different from the code schedule of the actuating signal applied to coder 12 but because of the control exhibited by counting mechanism 25 on gate 32 the two code schedules are related.

The addition of the phase inversion type coding by encoding device 13 to the jitter type introduced by encoding device 12 results in a picture display at an unauthorized receiver that is thoroughly scrambled to the point that absolutely no intelligibility may be derived. With such an arrangement, the two distinctly different code schedules are developed from common code selector 28 and this provides the important advantage of requiring only one adjustment to establish the mode changing operations of both types of coding.

As mentioned hereinbefore, it is desirable to employ reset pulses to establish all of the multivibrators corresponding to 33 employed in the system to a predetermined reference operating condition or step from time to time. Reset signal source 34 produces such pulses for multivibrator 33 at the transmitter once per sixty fields as in the aforementioned Eilers et al. application, Serial No. 344,996. Source 34 supplies signal bursts corresponding to the reset pulses to mixer 14 for transmission to the subscriber receivers. As will be seen later, a reset filter and rectifier unit is provided at each receiver to filter out and rectify the signal bursts contained in the composite television signal to provide reset pulses for actuating a multivibrator corresponding to 33 to the same reference operating condition, in synchronism, also as shown in the Eilers et al. application.

The combinations of code bursts or components, without alternation or permutation, are preferably transmitted to subscriber receivers along with the composite video signal as a modulation component. This is expedient inasmuch as the unaltered combinations themselves do not reveal the manner in which the counting mechanism is rephased during field-retrace intervals in response to the altered or permuted combinations of code bursts. In the illustrated embodiment, the unaltered code signal bursts are applied to mixer 14 from source 27 wherein they are added to the video signal during the field-retrace intervals in the manner described in the aforementioned copending Roschke application, Serial No. 479,170.

By way of summary, the transmitter of Figure 1 comprises means (picture converting device 10 and video amplifier 11) for developing a television signal. There is encoding apparatus coupled to the television-signal-developing means and this apparatus includes first and second encoding devices (jitter coder 12 and phase inversion coder 13) responsive to applied signals for varying two different characteristics of the television signal to effect two different types of encoding. Specifically, coder 12 varies the time relationship between video and synchronizing components and coder 13 inverts the phase of the video components. Coding signal source 27, permutation switching mechanism or coder selector 28, normally-closed gate circuits 29, counting mechanism 25, normally-closed gate circuits 31 and 32, and bi-stable multivibrator 33 collectively may be considered means including an adjustable code selector (28) for developing two different actuating signals (namely at the output of counting mechanism 25 and at the output of multivibrator 33) representing first and second distinctly different code schedules as determined at least in part by the instantaneous adjustment of code seletcor 28. The connections between control mechanism 25 and coder 12 and between multivibrator 33 and coder 13 constitute means for utilizing the actuating signals for effecting operation of the first and second encoding devices in accordance with the first and second code schedules, respectively, to develop an encoded intelligence signal. Mixer 14, D.C. inserter 15, unit 16, and antenna 17 constitute means for utilizing the encoded television signal.

Turning now to the subscription television receiver of Figure 2 which is constructed to decode the coded television signal radiated by the transmitter of Figure 1, an antenna 40 is connected to a radio-frequency amplifier 41 which is coupled through a conventional first detector 42 and IF amplifier 43 to a second detector 44 having output terminals connected through a video amplifier 45 to a phase inversion decoder 46. Decoder 46 may be identical with corresponding coder 13 at the transmitter and when properly controlled it introduces a phase inversion to the portions of the video signal that are transmitted in opposite phase. In other words, when the video signal is phase inverted at the transmitter such that "black" components represent white information, and vice versa, decoder 46 introduces a compensating phase inversion so that the video signal exhibits the original phase or polarity. Conversely, when coder 13 at the transmitter translates the video signal with no phase inversion, decoder 46 likewise effects translation with no phase reversal.

The output of decoder 46 is connected through a jitter decoder 47 to the input electrodes of a cathode-ray image-reproducing device or picture tube 49. Jitter decoder 47 is, of course, similar to coder 12 at the transmitter and is actuated to operate in a complementary fashion in order to compensate for variations in the timing of the video and synchronizing components of the received television signal. Specifically, when a delay is introduced between a line-synchronizing component and the video information occurring during the immediately following line-trace interval, the received video is translated through decoder 47 with no delay. On the other hand, when no delay is introduced at the transmitter between line-synchronizing and video components, a delay is introduced in jitter decoder 47. The two coding techniques illustrated are of the commutative type, and decoding may be achieved either in the order shown in Figure 2 or in reverse; if desired, jitter decoder 47 may precede phase inversion decoder 46. Copending application Serial No. 675,765, filed concurrently herewith in the name of Walter S. Druz, and also assigned to the present assignee, discloses and claims a system wherein two non-commutative and successive coding functions must be compensated at the receiver in an order inverse to their occurrence.

Second detector 44 is also coupled to a synchronizing-signal separator 50 having output circuits connected to a field-sweep system 51 and a line-sweep system 52 connected in turn to associated deflection elements (not shown) of picture tube 49.

As indicated by the use of corresponding primed reference numerals, the remaining circuitry of Figure 2, with the exception of a decoding signal source 53 and a reset signal filter and rectifier unit 54, is identical to the correspondingly numbered elements of Figure 1. Line-drive pulses for units 25′, 31′ and 29′ are derived from line-sweep system 52 in the receiver rather than from the synchronizing-signal generator as in the case of the transmitter. Decoding signal source 53, which may comprise a series of six filter and rectifier units is coupled to the output of video amplifier 45 to filter out and rectify the code signal components of the six different code frequencies $f_1$–$f_6$. The setting of permutation switching mechanism 28′ must, of course, correspond to the adjustment of code selector 28 at the transmitter in order that synchronous decoding may take place. The requisite setting of switching mechanism 28′ is made known only to authorized subscribers.

Unit 54, which has its input terminals connected to the output circuit of video amplifier 45 and its output terminals connected to an input circuit of multivibrator 33′, is the counterpart of reset signal source 34 and is provided to filter out the reset bursts from the received television signal to produce reset pulses for multivibrator 33′.

In the operation of the described receiver, the coded television signal is picked up by antenna 40, amplified in radio-frequency amplifier 41 and demodulated or heterodyned to the selected intermediate frequency in detector 42. The intermediate frequency signal thereby developed is amplified in amplifier 43 and detected in detector 44 to produce a coded composite video signal. This latter signal is amplified in video amplifier 45, translated through phase inversion decoder 46 and jitter decoder 47 to the input electrodes of image reproducer 49 to intensity modulate the electron beam in that device in conventional manner. The sweep systems 51 and 52 are, of course, operated in conventional manner.

Decoding at the receiver is accomplished in the identical manner explained hereinbefore in connection with the coding operation at the transmitter. Briefly, counting mechanism 25′ operates in cyclic fashion in response to line-drive pulses from sweep system 52 to produce a square wave actuating signal for jitter decoder 47. During each field-retrace interval, decoding signal source 53 separates a combination of code signal bursts or components from the coded composite video signal and code selector 28′ alters or permutes these components for application to the various gate circuits 29′ to gate in selected line-drive pulses to the several input circuits of the two bi-stable multivibrators in counting mechanism 25′ in order to rephase it in synchronism with the corresponding operation at the transmitter. Counter 25′ therefore develops a signal having the identical wave shape to that developed in the corresponding counting mechanism at the transmitter for application to jitter decoder 47 to compensate for the delays introduced in the video signal at the transmitter, namely, to introduce a compensating time relationship change between video and sync with each change in the received coded video signal. Hence, the video signal of the received telecast is decoded as to the jitter type of coding.

Gate 32′ meanwhile receives similar signals as those received by gate 32 and therefore triggers multivibrator 33′ in time coincidence with multivibrator 33 at the transmitter to produce an actuating signal to operate decoder 46 each time there is a phase inversion introduced at the transmitter between video and sync. The video phase inversions are thus compensated by decoder 46 and thus decoding has been effected for both types of coding to provide an intelligible signal for picture tube 49 for successful or faithful image reproduction.

The invention, therefore, provides an improved subscription television system in which extremely complex mode changing is achieved by coding two different characteristics of the television signal in accordance with two distinctly different actuating signals which are developed by means of a single adjustable code selector whose adjustment determines at least in part the nature of the two actuating signals.

While particular embodiments of the invention have been shown and described, modifications may be made, and it is intended in the appended claims to cover all such modifications as may fall within the true spirit and scope of the invention.

I claim:

1. A subscription television system comprising: means for developing a television signal; encoding apparatus coupled to said television-signal-developing means and including first and second encoding devices responsive to applied signals for varying two different characteristics of said television signal to effect two different types of encoding; means including an adjustable code selector for developing two different actuating signals representing first and second distinctly different code schedules as determined at least in part by the instantaneous adjustment of said code selector; means for utilizing said actuating signals for effecting operation of said first and second encoding devices in accordance with said first and second encoding devices in accordance with said first and second code schedules, respectively, to develop an encoded television signal; and means for utilizing said encoded television signal.

2. A subscription television system comprising: means for developing a television signal; encoding apparatus coupled to said television-signal-developing means and including first and second encoding devices responsive to applied signals for simultaneously varying two different characteristics of said television signal to effect two different types of encoding; means including an adjustable code selector for developing two different actuating signals representing first and second distinctly different but yet related code schedules as determined at least in part by the instantaneous adjustment of said code selector; means for utilizing said actuating signals for effecting operation of said first and second encoding devices in accordance with said first and second code schedules, respectively, to develop an encoded television signal; and means for utilizing said encoded television signal.

3. A subscription television system comprising: means for developing a television signal; encoding apparatus coupled to said television-signal-developing means and including cascade connected first and second encoding devices responsive to applied signals for varying two different characteristics of said television signal to effect two different types of encoding; means including an adjustable code selector for developing two different actuating signals representing first and second distinctly different code schedules as determined at least in part by the instantaneous adjustment of said code selector; means for utilizing said actuating signals for effecting operation of said first and second encoding devices in accordance with said first and second code schedules, respectively, to develop an encoded television signal; and means for utilizing said encoded television signal.

4. A subscription television system comprising: means for developing a television signal including video components occurring during a series of field-trace intervals recurring at a predetermined field-scanning frequency; encoding apparatus coupled to said television-signal-developing means and including first and second encoding devices responsive to applied signals for varying each of two different characteristics of said television signal between two different operating modes to effect two different types of encoding; means including an adjustable code selector for developing a first actuating signal representing the occurrence of mode changes at a rate faster than said field-scanning frequency and a second actuating signal representing the occurrence of mode changes at a rate slower than said field-scanning frequency as determined at least in part by the instantaneous adjustment of said code selector; means for utilizing said first actuating signal for effecting faster-than-field rate operation of said first encoding device and said second actuating signal for effecting slower-than-field rate operation of said second encoding device to develop an encoded television signal; and means for utilizing said encoded television signal.

5. A subscription television system comprising: means for developing a television signal including video components occurring during a series of field-trace intervals recurring at a predetermined field-scanning frequency; encoding apparatus coupled to said television-signal developing means and including first and second encoding devices responsive to amplitude variations of applied signals for altering each of two different characteristics of said television signal between two different operating modes to effect two different types of encoding; means including an adjustable code selector for developing a first actuating signal exhibiting amplitude variations occurring at a rate faster than said field-scanning frequency to represent a first code schedule and a second actuating signal having amplitude variations occurring at a rate slower than said field-scanning frequency to represent a second code schedule as determined at least in part by the instantaneous adjustment of said code selector; means for utilizing said first actuating signal for effecting faster-than-field rate operation of said first encoding device and said second actuating signal for effecting slower-than-field rate operation of said second encoding device to develop an encoded television signal; and means for utilizing said encoded television signal.

6. A subscription television system comprising: means for developing a television signal; encoding apparatus coupled to said television-signal-developing means and including first and second encoding devices responsive to applied signals for varying two different characteristics of said television signal to effect two different types of encoding; an adjustable code selector; means coupled to said code selector for developing a first actuating signal representing a first code schedule as determined at least in part by the instantaneous adjustment of said code selector; means coupled to said last-mentioned means for developing a second actuating signal representing a second code schedule distinctly different from said first code schedule; means for utilizing said actuating signals for effecting operation of said first and second encoding devices in accordance with said first and second code schedules, respectively, to develop an encoded television signal; and means for utilizing said encoded television signal.

7. A subscription television system comprising: means for developing a television signal; encoding apparatus coupled to said television-signal-developing means and including first and second encoding devices responsive to applied signals for varying two different characteristics of said television signal to effect two different types of encoding; an adjustable code selector; means coupled to said code selector for developing a first actuating signal representing a first code schedule as determined at least in part by the instantaneous adjustment of said code selector; means coupled to said last-mentioned means and also to said code selector for developing a second actuating signal representing a second code schedule conjointly determined by the instantaneous adjustment of said code selector and said first code schedule; means for utilizing said actuating signals for effecting operation of said first and second encoding devices in accordance with said first and second code schedules, respectively, to develop an encoded television signal; and means for utilizing said encoded television signal.

8. A subscription television system comprising: means for developing a television signal; encoding apparatus coupled to said television-signal-developing means and including first and second encoding devices responsive to applied signals for varying two different characteristics of said television signal to effect two different types of encoding; a source of code signal components; means including and adjustable code selector coupled to said source for utilizing at least some of said code signal components to develop a first actuating signal representing a first code schedule and a second actuating signal representing a second distinctly different code schedule as determined at least in part by the instantaneous adjustment of said code selector; means for utilizing said actuating signals for effecting operation of said first and second encoding devices in accordance with said first and second code schedules, respectively, to develop an encoded television signal; and means for utilizing said encoded television signal.

9. A subscription television system comprising: means for developing a television signal; encoding apparatus coupled to said television-signal-developing means and including first and second encoding devices responsive to applied signals for varying two different characteristics of said television signal to effect two different types of encoding; a source of code signal components; adjustable permuting means coupled to said source for permuting some of said code signal components in accordance with the instantaneous permuting pattern established by said permuting means; a first control mechanism coupled to said permuting means for utilizing at least some of the permuted components to develop a first actuating signal representing a first code schedule; a second control mechanism coupled to said source for utilizing some of said code signal components to develop a second actuating signal representing a second code schedule distinctly different from said first code schedule; means for utilizing said actuating signals for effecting operation of said first and second encoding devices in accordance with said first and second code schedules, respectively, to develop an encoded television signal; and means for utilizing said encoded television signal.

10. A subscription television system comprising: means for developing a television signal; encoding apparatus coupled to said television-signal-developing means and including first and second encoding devices responsive to applied signals for varying two different characteristics of said television signal to effect two different types of encoding; a source of code signal components; adjustable permuting means coupled to said source for permuting some of said code signal components in accordance with the instantaneous permutation pattern established by said permuting means; a first control mechanism coupled to said permuting means for utilizing at least some of the permuted components to develop a first actuating signal representing a first code schedule; a second control mechanism coupled to said permuting means for utilizing certain other ones of the permuted components to develop a second actuating signal representing a second code schedule distinctly different from said first code schedule; means for utilizing said actuating signals for effecting operation of said first and second encoding devices in accordance with said first and second code schedules, respectively, to develop an encoded television signal; and means for utilizing said encoded television signal.

11. A subscription television system comprising: means for developing a television signal; encoding apparatus coupled to said television-signal-developing means and including first and second encoding devices responsive to applied signals for varying two different characteristics of said television signal to effect two different types of encoding; a source of code signal components; adjustable permuting means coupled to said source for permuting some of said code signal components in accordance with the instantaneous permutation pattern established by said permuting means; control means coupled to said permuting means for utilizing at least some of the permuted components to develop a first actuating signal representing a first code schedule; gating means having a translating condition and a non-translating condition coupled to said permuting means; means coupling said control means to said gating means for varying the translating condition of said gating means in accordance with said first code schedule to translate certain ones of the permuted code signal components through said gating means; means coupled to said gating means for utilizing the translated code signal components to develop a second actuating signal representing a code schedule distinctly different from said first code schedule; means for utilizing said actuating signals for effecting operation of said first and second encoding devices in accordance with said first and second code schedules, respectively, to develop an encoded television signal; and means for utilizing said encoded television signal.

12. A subscription television system comprising: means for developing a television signal having video components and synchronizing components; a jitter type encoder coupled to said television-signal-developing means and responsive to an applied signal for varying the time relation between said video and synchronizing components to effect jitter type encoding; a phase inversion encoder coupled to said television-signal-developing means and responsive to an applied signal for inverting the phase of said video components with respect to said synchronizing components to achieve phase inversion type encoding; means including an adjustable code selector for developing two different actuating signals representing first and second distinctly different code schedules as determined at least in part by the instantaneous adjustment of said code selector; means for utilizing said actuating signals for effecting operation of said jitter type and phase inversion encoders in accordance with said first and second code schedules, respectively, to develop an encoded television signal; and means for utilizing said encoded television signal.

13. A subscription television transmitter comprising: means for developing a television signal; coding apparatus coupled to said television-signal-developing means and including first and second coding devices responsive to applied signals for varying two different characteristics of said television signal to effect two different types of coding; means including an adjustable code selector for developing two different actuating signals representing first and second distinctly different code schedules as determined at least in part by the instantaneous adjustment of said code selector; means for utilizing said actuating signal for effecting operation of said first and second coding devices in accordance with said first and second code schedules, respectively, to develop a coded television signal; and means for utilizing said coded television signal.

14. A subscription television receiver comprising: means for developing a television signal; decoding apparatus coupled to said television-signal-developing means and including first and second decoding devices responsive to applied signals for varying two different characteristics of said television signal to effect two different types of decoding; means including an adjustable code selector for developing two different actuating signals representing first and second distinctly different code schedules as determined at least in part by the instantaneous adjustment of said code selector; means for utilizing said actuating signals for effecting operation of said first and second decoding devices in accordance with said first and second code schedules, respectively, to develop a decoded television signal; and means for utilizing said decoded television signal.

References Cited in the file of this patent

UNITED STATES PATENTS

| | | |
|---|---|---|
| 2,510,046 | Ellett | May 30, 1950 |
| 2,547,598 | Roschke | Apr. 13, 1951 |
| 2,574,462 | Brown | Nov. 13, 1951 |
| 2,769,025 | Hoffmann | Oct. 30, 1956 |

FOREIGN PATENTS

| | | |
|---|---|---|
| 1,120,543 | France | Apr. 23, 1956 |

OTHER REFERENCES

Statement of Zenith, Appendix before the F.C.C. in the Matter of: Amdt. of Part 3 of the Commission's Rules and Regulations (Radio Broadcast Services) to Provide for Subscription Television Service, rec'd. by the U.S. Patent Office, June 21, 1955.